INVENTORS
BERNARD QUANQUIN
YVES BERQUIN

Aug. 27, 1968  B. QUANQUIN ET AL  3,398,458
METHOD AND MEANS FOR THE INTRODUCTION OF FLUIDS
INTO A ROTATING CONTAINER
Filed Dec. 2, 1966  2 Sheets-Sheet 2

INVENTORS
BERNARD QUANQUIN
YVES BERQUIN

BY J. William Miller
ATTORNEY

United States Patent Office 3,398,458
Patented Aug. 27, 1968

3,398,458
METHOD AND MEANS FOR THE INTRODUCTION OF FLUIDS INTO A ROTATING CONTAINER
Bernard Quanquin, Grand-Couronne, and Yves Berquin, Paris, France, assignors to Potasse & Engrais Chimiques, Paris, France
Filed Dec. 2, 1966, Ser. No. 598,706
Claims priority, application France, Mar. 25, 1966, 54,934
12 Claims. (Cl. 34—33)

The present invention relates in general to an improved method for the introduction of a gas into a mass of solid materials, and more particularly to a method of injecting a gas into a mass of solids which is being tumbled in a hollow cylinder, inclined slightly from the horizontal, and rotating around its axis.

These rotary drums are used in a variety of operations such as physical transformation of solid materials (i.e., granulation and/or drying), chemical reactions between solids and liquid or gaseous reagents, and in simultaneously carrying out these various operations. In the continuous operation of the rotary drum, particulate material in the wet or dry state is charged into the elevated end of the drum and the resultant layer or "bed" of solids is continuously mixed due to the rotation of the drum. To maintain a constant quantity of solids in process, annular plates or retaining rings are positioned at each end of the drum, one of which holds back the solids entering the drum, and the other is serving as an outlet for the discharging product. The thickness of the bed of solids therefore depends upon the width of the outlet retaining ring.

In cases where the solid material in the drum is to be treated with one or more gases, it is generally necessary to introduce the gas (or gases) directly into the bed of solids to effect maximum gas-solid, or gas-liquid contact. From among the various known gas distributing devices, the most widely employed are ramps formed from tubes having a plurality of gas ports therein. These ramps which are positioned parallel to the axis of the drum lie immersed in the bed of solids.

Since the ramps are fixedly positioned at the inside of the drum, they impede the movement of the bed of solids, thereby hindering mixing of the solids, and decreasing the gas-solid contact.

In many of the larger drums, having relatively long ramps, the pressure exerted thereagainst by the rotating bed of solids often bends the ramp. To prevent this from happening, it is usually necessary, particularly in the use of the larger industrial drums, to fixedly attach the ramp to the drum and keep it rigid with rods, fins and the like. The means used to hold the ramp rigid lie adjacent the inside surface of the drum; consequently, they increase the resistance to the movement of the bed.

It has also been known to position the ramp perpendicularly to the rational axis of the drum, the free end of the ramp being profiled to reduce the resistance to the flow of solids thereabout. In order to uniformly treat the bed over its entire length, a plurality of such ramps must of necessity be used, even though they obstruct the normal progression of the solids through the drum.

Regardless of the type of immersed distributing device utilized, its surface often becomes quickly covered with a deposit of the solid material which is usually strongly adhesive. As the deposit on the device grows progressively larger, the resistance to the movement of solids (mixing and lengthwise advance) is increased. At the same time, this additional force bears against the distributor, often causing distortion or even rupture. Moreover, the deposits obstruct the gas outlets partly or entirely and, as a result, the gas is unevenly distributed in the bed of solids to be treated. It is, therefore, frequently necessary to interrupt and shut down the operation in order to dismantle and clean the distributing device.

Moreover, the ramp and means used to hold it rigid, as well as any other obstacle impeding the motion of solids in the bed, hastens the formation of deposits and crusts on the wall of the drum, it being then frequently necessary to interrupt the operation of the drum. Although there are available a variety of cleaning devices to continuously scrape off the crusts as they are formed, these devices are troublesome in operation and expensive to maintain.

It is therefore a principal object of the invention to overcome the foregoing drawbacks and provide an improved process for the injection of gas into a bed of solids within a rotary drum.

Another object of this invention is to provide an improved device for the introduction of a fluid into the material being treated in a rotary drum.

Still another object of the invention is to provide an improved line responsive valve for use in rotary drums.

Other objects and advantages of the invention will become apparent by reference to the following description and claims, taken in conjunction with the accompanying drawings in which:

To attain the foregoing objects, there is provided a rotary drum whose inside wall is divided into successive, longitudinal sectors through which a fluid, from an external source is passed into the drum. Each of the sectors can be independently connected to the fluid source, and the fluid is introduced into the longitudinal sectors of the drum on which the bed of solids rests.

In accordance with the invention, each longitudinal sector can be fed with one or several gases; in the latter case, the gases can be introduced through the wall of the drum either mixed, if the gases are inert to each other, or separately, if there is any risk of a reaction between them. For example, gaseous mixtures like air-steam, air-carbon dioxide, etc. can be introduced together through the wall, whereas gases like carbon dioxide and ammonia are preferably introduced separately to each longitudinal sector even though they are injected into the drum simultaneously.

Figure 1:
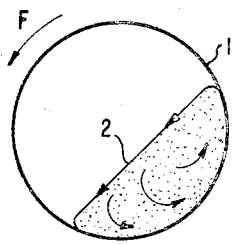
FIGURE 1 represents a schematic cross section of a rotary drum, illustrating the position of the bed with respect to the direction of rotation (arrow).

In a rotary drum, the surface of the bed which is substantially horizontal before rotation is initiated, assumes an inclined position as the drum rotates, as shown in FIGURE 1. The layer of solids immediatey adjacent wall 1 is held in place by friction, but as the drum turns, and the layer is raised it loses its grip on the wall. This layer then drops by gravity onto the bed and the free surface 2 becomes more or less inclined, depending upon the angle of repose of the piled substance to be treated. At the same time, the layer, formerly in contact with the drum wall, is then replaced by a new one coming from a shallower portion of the bed. In turn, this new layer is raised and drops onto the surface of the bed. In this manner a continuous and methodical motion of the solids between the free surface of the bed and the wall of the drum is maintained.

As already explained here above the presence of ramps, channels, and other objects in the drum which impair the movement of the tumbling bed of solids reduces the gas-solid contact. By use of the drum of the present invention which avoids the use of any device immersed in the bed, better circulation of solids in the drum is achieved with more homogeneous mixing and optimal gas-solid or gas-liquid contact. The inside wall of the present drum is preferably divided in longitudinal sectors of equal size, the number of which depends upon the diameter of the drum and the nature of the solid material to be treated.

This number is chosen so that the gas feeding under the bed of solids can last over a sufficient period of time. When a longitudinal sector arrives under the bed of solids it should not be fed before it is totally covered by the bed in order to avoid gas escaping into the atmosphere of the drum without contacting the solids. For the same reason when a longitudinal sector turns away from underneath the bed of solids, the gas feeding must be stopped soon enough. Consequently it is advantageous that the longitudinal sectors be relatively narrow and therefore more numerous. However when the number of sectors is very high the number of feeding lines increases correspondingly whereby the drum becomes very heavy and cumbersome. In industrial practice where drums having diameters ranging from 0.80 to 4.50 m. are used a number of longitudinal sectors ranging from 6 to 60 can be utilized. For example, it has been found that a drum having a diameter of 1.10 m. is suitably divided into 18 longitudinal sectors and a drum having a diameter of 4 m. into 40 longitudinal sectors for simultaneous granulation and ammoniation of fertilizers.

Some industrial processes require a subsequent treatment of the solids leaving the drum according to the invention such as, for example, further drying, cooling and the like. In this case, the treatments can be performed in a single drum separated into two sections by a retention ring, the first section being divided into longitudinal sectors and the second section having a smooth wall or being provided with flights, scoops, etc. . . .

According to the invention the gas can be fed in longitudinal sectors through check valves directly set in the outer wall of the drum but the inner wall of each longitudinal sector is preferably lined with a sheet or plate provided with resilient means which acts as a check valve, thus permitting gas to pass into the drum but preventing solid particles from entering the gas inlet. For example, a flexible metal sheet can be used when the solid to be treated has no tendency to adhere to the metal or promote corrosion thereof. It is also advantageous to use membranes or resilient plates of a synthetic resin having non-adhesive properties such as polytetrafluorethylene (Teflon) or certain silicones.

The pressure exerted by the gas on the lower surface of the plates is nearly compensated by the weight of the bed, the difference corresponding to the sum of the pressure drop through the bed and of the pressure necessary to actuate the valve. Therefore the suitable range of thickness for the plates varies with the substance used. For example, a Teflon plate having a thickness of about 2 to 4 mm. has been found suitable for treatment of solids by a gaseous reagent. With more resilient substances plates could be thicker and plates of reinforced rubber or reinforced synthetic resins can be thinner.

Figure 2:
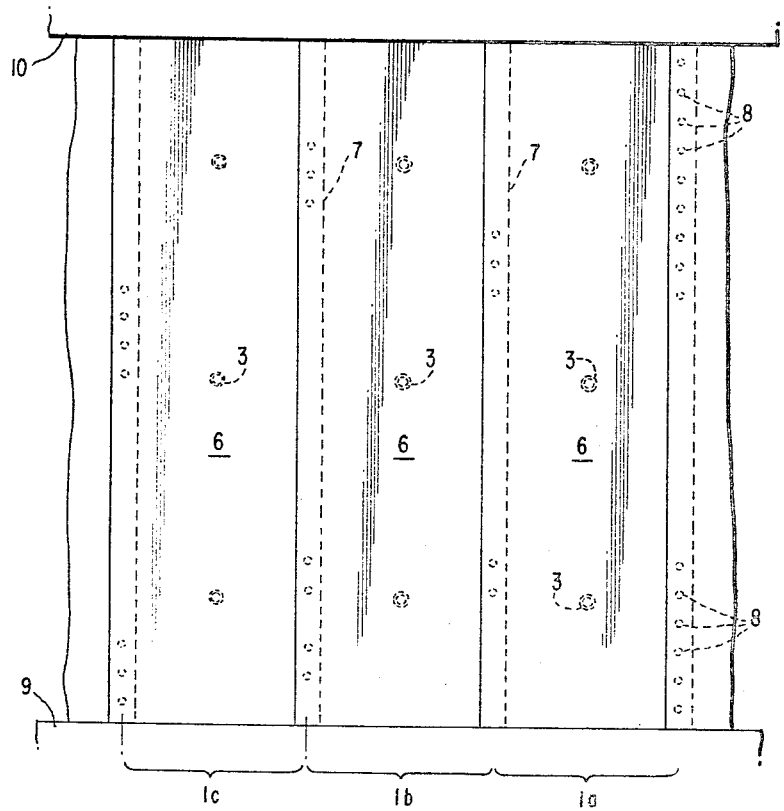
FIGURE 2 is a partially developed view of the inner surface of a drum of this invention.
Figure 3:
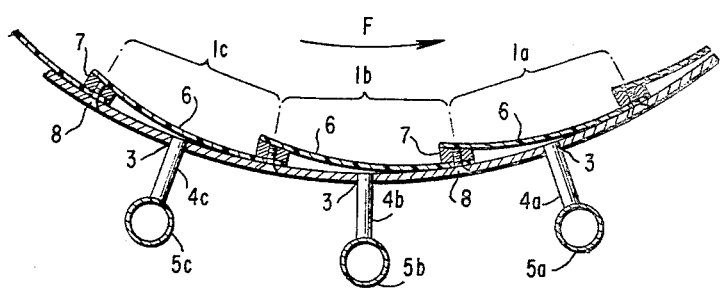
FIGURE 3 is a partial cross section of the drum of FIGURE 2, illustrating the arrangement of the membranes and device used to inject a gas through the wall of the drum.

Among the various types of check valves suitable for use herein are those illustrated in FIGURES 2 and 3 wherein 1a, 1b, and 1c represent three separate longitudinal sectors each having several gas injection ports 3 positioned along the sectors. The gas ports 3 are connected via lines 4a, 4b, and 4c (FIGURE 3) to gas feed conduits 5a, 5b, and 5c which are, in turn, connected to a suitable automatic gas distributor.

Covering each sector of the drum is a resilient, non-adhesive plastic plate, rectangular in shape, which is affixed along one of its longer sides to the inner wall of the drum. A narrow metal strip or valve seat means 7 (FIGURES 2 and 3), preferably covered with a non-adhesive plastic, overlaps the plate and is firmly attached to the wall of the drum by screws 8 disposed along axes lying parallel to the axis of the cylinder.

The other three sides of the resilient plate are free and can be lifted by the application of slight pressure. The two shorter sides of the plate bear against retention rings 9 and 10 placed at each end of the drum, these rings being preferably covered with plastic material non-adhesive to the substance treated.

As the plate is raised or lowered the shorter sides thereof are in sliding contact with the retention ring.

The plates are generally disposed as shown in FIGURE 3, relative to the direction of rotation of the drum as indicated by arrow F, the longer fastened side being ahead of the other longer side which is free to move. The latter side overlaps strip 7 affixed to the plate of the next sector and rests therein like a valve on its seat. When, during operation, the bed of solids rests on the plate, it is flexed inwardly toward the wall and maintained well spread out which improves its bearing surface on strip 7.

As each sector arrives under the bed of solids, the weight of the latter causes the membrane to be pressed against the seat of strip 7, preventing any of the particulate solids from entering the gas injection port. At this point, however, gas is injected into this sector and lifts the plate off its seat, and a thin layer of the gas emanates between the plate and its seat, said layer being uniformly distributed along the length of the bed.

Figure 4:
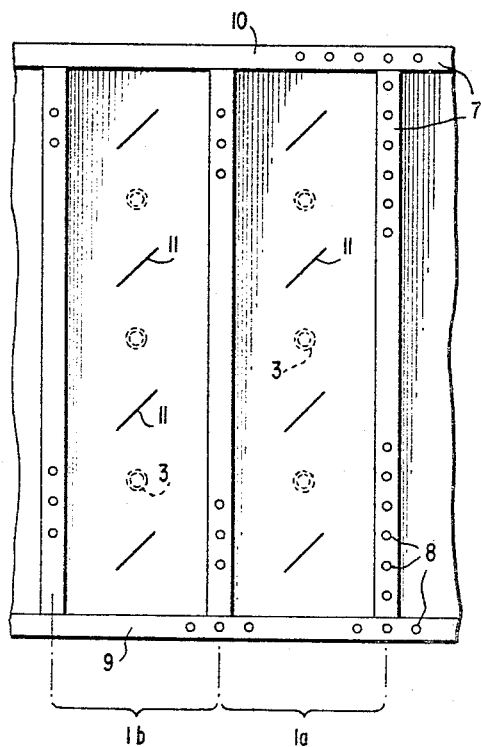
FIGURE 4 is a partially developed view of the inner surface of a drum, showing the arrangement of one check valve through which gas is injected into the drum.
Figure 6:
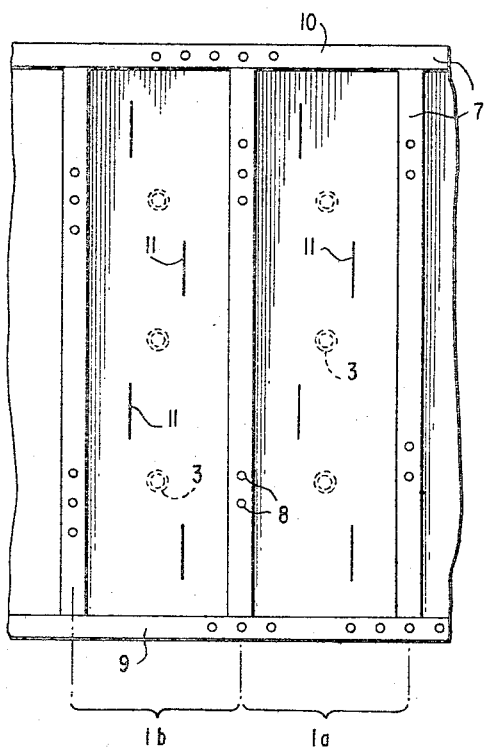
FIGURE 6 is a partially developed view of the inner surface of a drum, showing another arrangement of the check valves.
Figure 5:
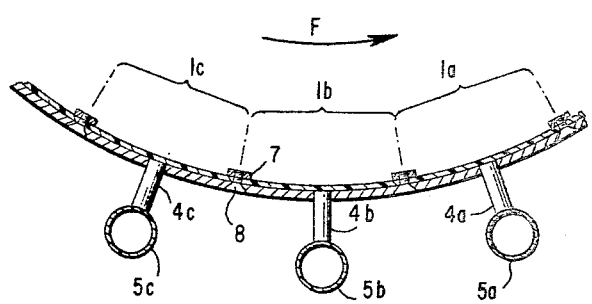
FIGURE 5 is a partial cross section of the drum of FIGURE 4, illustrating the construction of the check valves through which fluid is injected into the drum.

FIGURES 4, 5 and 6 illustrate another embodiment of the invention in which there is employed another type of check valve. According to this embodiment, all four sides of the plate, are affixed to the wall of the drum instead of only one longer side as in FIGURES 1 and 2. These plates can also be affixed to the drum by means of narrow metal strips, preferbaly covered with a synthetic resin, and a screw or pin extending through the plate and strip being used to attach these elements to the wall. In this arrangement, each sector forms an independent cell connected to the gas supply. To permit gas in the cell to pass into the drum without a backflow of solids, there are formed in the plate narrow slits 11 having adjacent lips. As fluid pressure in the cell is increased, the resilient plate bulges causing the lips of the slit to part, and the gas to pass therethrough. When the flow of high pressure gas ceases, the weight of the bed forces the plate back to its initial position and the slits again close.

It is preferred to evenly distribute the slits along the sector, the size and number of slits depending, of course, upon the desired volume of gas to be charged. These slits can be placed parallel to the longitudinal axis of the drum, but it is preferred to position them slantwise, so that their axis forms an angle with the longitudinal axis of the drum, as shown on FIGURE 4, or in quincunx, as shown on FIGURE 6. These two ways can be combined, slanting slits placed in quincunx, or any other arrangement which avoids adjacent slits from being in prolongation with one another.

When a membrane having slits therein is used as the check valve, it is preferred to construct the membrane from materials such as rubber or resilient synthetic resins reinforced or not.

The foregoing elastic plates for covering each sector are preferred, but without departing from the spirit and scope of the invention, rigid plate means in which are set valves with flexible membranes, or other means which distribute the gas into the bed without allowing the solids to penetrate into the gas feed pipes can be used.

To selectively discharge gas from each longitudinal sector as it passes under the bed of solids, there is provided a gas distributor which supplies gas to the longitudinal sectors according to a predetermined program. Among the several known automatic gas distributors available, it is preferred to employ a rotary axial distributor, especially the type used with rotary vacuum filters.

These axial distributors comprise a generally circular rotatable plate and a stationary counter plate. The rotary plate which is centered on the axis of the drum and turns with it, has a plurality of spaced holes therein disposed in a circle. The gas tubes from each of the longitudinal sectors are connected to one side of the rotatable plate and communicate with the holes therein. Bearing against the other side of the rotatable plate which is perfectly plane and very smooth is a counter plate, also perfectly smooth and polished on its contact surface, each plate being rigorously centered with the other.

In the counter plate are a plurality of circularly spaced holes and/or slots which communicate and register with the holes in the rotatable plate as it turns. Each hole or slot in the counter plate is connected to the source of high pressure gas. As the drum and rotatable plate turn, the stationary counter plate bearing thereagainst, forms a gas-tight seal. During operation, gas is admitted only when a hole (or several holes) in the rotatable plate register with a hole or a slot in the counter plate, the corresponding feed pipe (or pipes) of a sector being connected to the gas source.

Depending upon the number of sectors in the drum and the direction of gas flow, the axial distributor is routinely adapted to any desired operation merely by varying the number of holes and/or length of the slots and their arrangement in the plates.

The present rotary drum, into which a gas is introduced through the wall thereof, can be used for any reaction between a more or less wet solid, granulated or not, and one or several gaseous reagents, provided that the solid is suitably divided and has sufficient affinity for the gaseous reagent (or reagents). In addition to the gas-solid treatment, other operations, for example granulating and/or drying, can be simultaneously carried out.

Solids are fed into the rotary drum in the usual way, through a hopper for example.

The process of the invention, therefore, has wide application in the chemical industry in general, but it is particularly valuable in the fertilizer industry where there is very often a problem of absorbing gaseous reagents in a bed of solids. For example, the present process can be advantageously used for the introduction of ammonia into an ammoniation drum or a granulation ammoniation drum such as those used for many operations in the manufacture of fertilizers, ammoniation of pastes obtained by digesting phosphate rock with nitric acid, optionally mixed with other inorganic acids, ammoniation of superphosphates, preparation of highly concentrated fertilizers containing ammonium salts such as phosphates and/or nitrates and/or sulfates by the reaction of ammonia with the corresponding acid (or acids) in a bed of recycled fines etc. The process can also be used in the last step of the manufacture of complex fertilizers by the nitro-carbonic process wherein the slurry obtained by digesting phosphate rock and neutralizing with ammonia is finally treated with carbon dioxide and ammonia to transform the calcium nitrate into calcium carbonate and ammonium nitrate. In this latter case, the two gaseous reagents are introduced separately but simultaneously into the reaction mixture during its granulation.

There can also be used with the present rotary drum other conventional devices which remain out of contact with the bed of solids. For example, sprayers or spraying ramps can be positioned above the bed of solids for either the introduction of liquid reagents, or other substances to be granulated in liquid form or as a slurry. With such a drum fertilizer granules can be prepared by spraying a solution or slurry to be treated onto a bed of priming granules and the gas (or gases) introduced are then reacted with a freshly deposited layer of sprayed substance. When operating in this way, there can be obtained granules formed by successive layers all having the same composition or by successive layers having different compositions. In the latter case, the bed comprises small granules or cores previously prepared in any granulating apparatus (mixer, granulating plate, etc.) and which are built up inside the drum by the deposit of successive layers of one or several substances having compositions different from that of the cores.

In another embodiment of the invention a gas is also injected into the end of the drum, for example, steam is injected during a granulation process, or cold or hot air is introduced to improve the drying of solids. When the gases to be introduced are, however, inert to the treated solid, it is more advantageous to employ the distribution system of the present invention because the gas feeding program can be conveniently modified to introduce the inert gases to the sectors during the period when they are not in contact with the bed of solids.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

EXAMPLE

A rotary drum having an inside diameter of 1.15 m. and a length of 5 m. is used. The drum is divided lengthwise into two sections of 2.50 m. The first section of the drum nearest the inlet end is divided into 18 longitudinal sectors lined with plates of Teflon of 0.19 m. width and 3 mm. thickness having 8 slits of 0.05 m. length positioned slantwise so that their axis forms an angle with the longitudinal axis of the drum.

A bed having a thickness of 30 cm. is maintained in the drum by feeding through a hopper 2800 kg. by hour of recycled fines of final product and 344 kg. by hour of potassium chloride containing 60% $K_2O$. On this bed 376 kg./h. phosphoric acid containing 55% $P_2O_5$ are sprayed by means of 2 sprayers and simultaneously an aqueous solution of ammonium nitrate by means of 2 further sprayers. This ammonium nitrate solution containing 80% $NH_4NO_3$ is prepared in a separate reactor by reacting 684 kg./h. of nitric acid containing 53% $NO_3H$ and 98 kg./h. of ammonia and evaporating the excess of water. The sprayers for the solution of ammonium nitrate and those for phosphoric acid are slidably mounted in alternate position on a support parallel to the axis of the drum disposed in the first section of the drum.

The sprayers are oriented so as to project the droplets onto the bed of solid particles.

Simultaneously 56 kg./h. of gaseous ammonia are introduced by a rotary axial distributor into the drum through the slits of the plates covered by the bed, the gas pressure being 60 g./cm.$^2$. There are obtained 1200 kg./h. of fertilizer granules containing 17.2% of nitrogen, 17.2% of phosphorus calculated as $P_2O_5$ and 17.2% of potassium calculated as $K_2O$ and having a commercial size ranging from 2 to 4 mm.

What is claimed is:

1. In a process for the introduction of fluid into a bed of material being tumbled in a cylinder having its cylindrical surface rotating about its longitudinal axis the improvement comprising injecting said fluid from an external source through said cylindrical surface into said bed of material, said injecting being conducted through at least one of a plurality of normally substantially closed valves in said cylindrical surface, at a point where said valve is covered in the interior of said cylinder with said bed of material, and wherein said injecting of said fluid forces said normally substantially closed valve to open, and the pressure of said fluid prevents said bed of material from trickling out of said valve, whereby a fluid distributor for said fluid in the interior of said bed of material is avoided, and improved contact between said fluid and said bed of material is obtained.

2. The process of claim 1 wherein said fluid is gas, and said material is particulate solids.

3. The process of claim 1 wherein there is injected through a plurality of valves a plurality of different gases.

4. The process of claim 1 wherein the cylinder is an ammoniation drum and ammonia is injected through said valves.

5. The process of claim 1 wherein the cylinder is a granulation ammoniation drum and ammonia is injected through said valves.

6. The process of claim 3 wherein the cylinder is used in the nitro-carbonic process for the manufacture of fertilizer, and carbon dioxide and ammonia are injected through said valves.

7. The process as defined by claim 1 wherein there is sprayed on granules forming the material to be treated a liquid which reacts with injected fluid, thereby promoting granulation of the solids.

8. A process as defined by claim 1 wherein said plurality of normally substantially closed valves comprises several valves disposed longitudinally along said cylinder.

9. In combination with a rotary drum inclined from the horizontal suitable for reacting, drying, granulating, or heating a material to be treated with a fluid, means to continuously inject fluid into material being tumbled in the drum comprising: fluid-responsive means, fluid pressure means, and fluid distribution means, said fluid-responsive means comprising a plurality of check valve means positioned about the inside periphery of the drum and being connected to the fluid distribution means, the fluid pressure means being connected to the fluid distribution means and supplying a fluid at a pressure higher than the pressure in the drum, said fluid distribution means being programmed to pass fluid only through the check valve means in the drum which are contiguous to and under the material being treated.

10. The combination as defined by claim 9 wherein said fluid-responsive means comprises a generally rectangular resilient plate means, an elongated valve seat means, both having their longitudinal axes lying parallel to the axis of the drum, said plate means having one of its longer sides affixed to the inside surface of the drum, the other of the longer sides resting on the valve seat means affixed to the drum and projecting outwardly from the inside surface thereof.

11. The combination as defined by claim 9 wherein said fluid-responsive means comprises a generally rectangular resilient plate means, said plate means having its sides affixed to the inside wall of the drum and also having slits therein which open and allow the passage of fluid therethrough when high-pressure fluid is supplied at a point between the wall of the drum and the plate means affixed thereto.

12. The combination as defined by claim 11 wherein adjacent slits lie along different axes.

References Cited

UNITED STATES PATENTS

| | | | |
|---|---|---|---|
| 888,475 | 5/1908 | Cummer | 34—135 |
| 2,581,756 | 1/1952 | Erisman | 34—135 |
| 2,999,015 | 9/1961 | Mortenson et al. | 23—259.1 |
| 3,101,040 | 8/1963 | Lanz | 34—142 XR |

KENNETH W. SPRAGUE, *Primary Examiner.*